(12) United States Patent
Gardner et al.

(10) Patent No.: US 6,283,255 B1
(45) Date of Patent: Sep. 4, 2001

(54) BRAKE AND PULLEY ASSEMBLY FOR A MOTORCYCLE

(75) Inventors: William C. Gardner, Ashland; Scott M. Brown, Blair, both of NE (US)

(73) Assignee: GMA Engineering, Inc., Omaha, NE (US)

( * ) Notice: Subject to any disclaimer, the term of this patent is extended or adjusted under 35 U.S.C. 154(b) by 0 days.

(21) Appl. No.: 09/435,555

(22) Filed: Nov. 8, 1999

(51) Int. Cl.[7] .................................................. B60T 1/06
(52) U.S. Cl. ................... 188/18 A; 188/218 XL; 188/71.6
(58) Field of Search .................... 188/344, 181 A, 188/181 R, 218 XL, 17, 18 R, 18 A, 71.6, 71.1; 180/219; 474/152, 158; D12/123

(56) References Cited

U.S. PATENT DOCUMENTS

| D. 436,561 | * | 1/2001 | Louden et al. | ............... D12/123 |
|---|---|---|---|---|
| 3,899,049 | * | 8/1975 | Martin | ................... 188/18 A |
| 4,848,521 | * | 7/1989 | Izumine | ................... 188/18 A |
| 5,890,980 | * | 4/1999 | Heyng | ................... 180/219 X |
| 5,964,312 | | 10/1999 | Maldonado . | |
| 5,992,587 | | 11/1999 | Maldonado . | |
| 6,170,617 | * | 1/2001 | Nakamura | ................... 188/71.6 |

* cited by examiner

*Primary Examiner*—Christopher P. Schwartz
*Assistant Examiner*—Melanie Torres
(74) *Attorney, Agent, or Firm*—Jackson Walker L.L.P.

(57) ABSTRACT

A brake and pulley assembly for retrofitting onto the hub of a belt driven, swingarm mounted rear wheel of a motorcycle. The hub has a multiplicity of bolt holes therein forming a bolt hole pattern. The hub is mounted to an axle. The brake and pulley assembly consists of a pulley and rotor unit. The pulley is bolted to the hub and the rotor is bolted or otherwise attached to the pulley. A caliper assembly is attached to the swingarm of the motorcycle and provides for frictionally engaging the rotor to slow the motorcycle down.

18 Claims, 15 Drawing Sheets

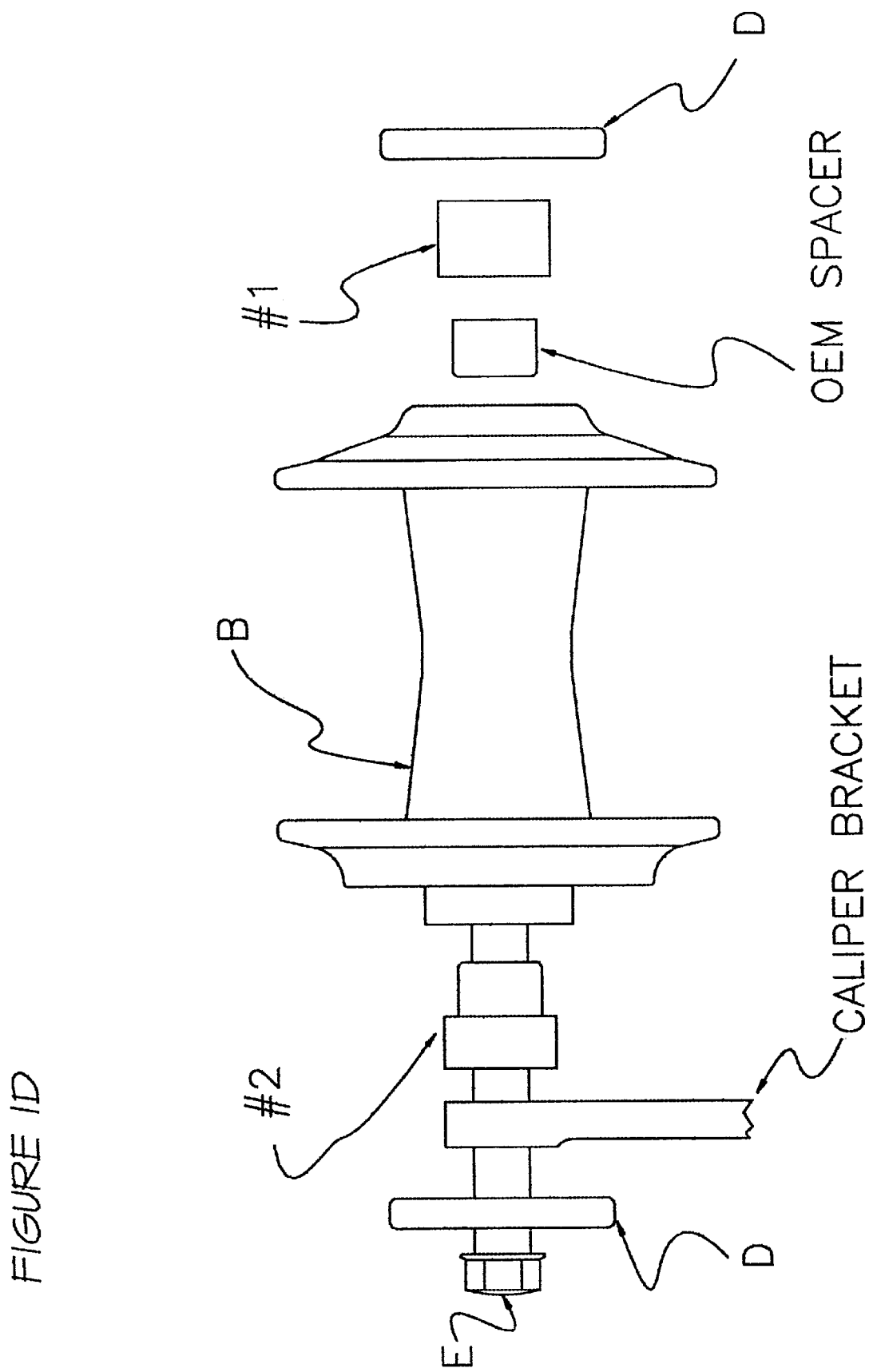

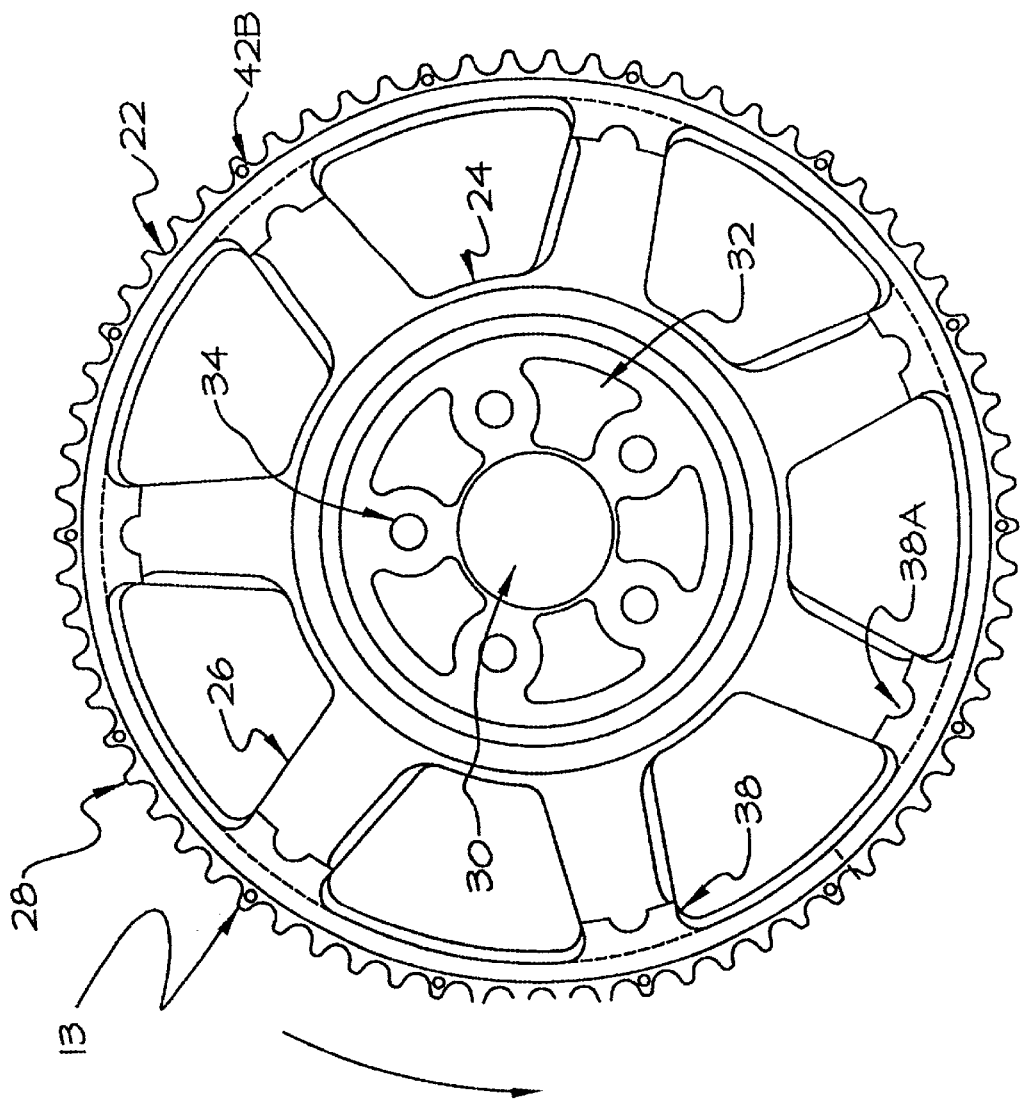
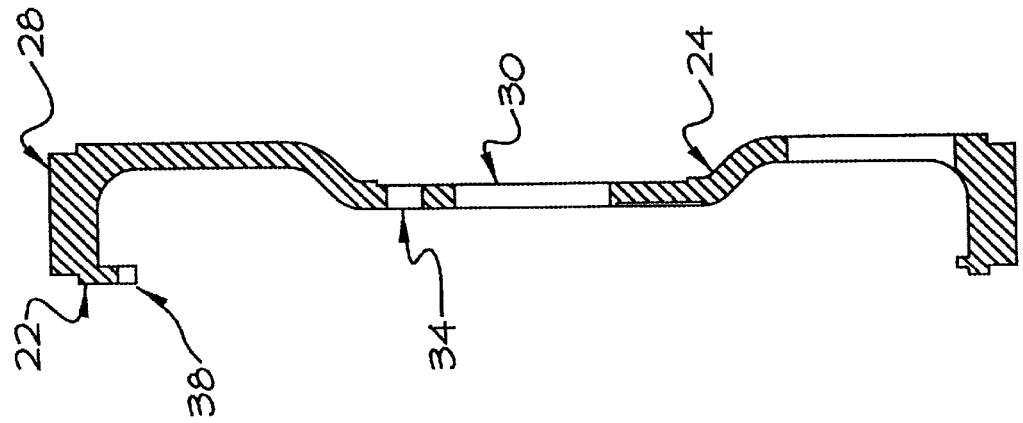

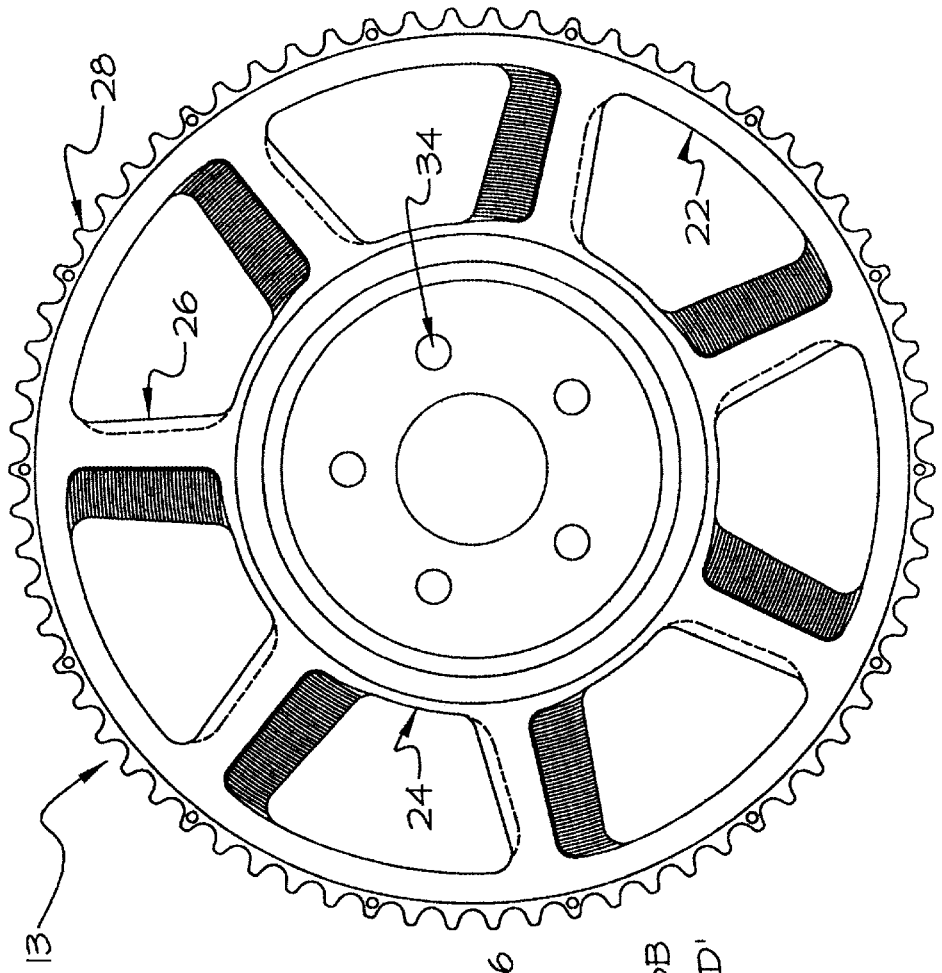
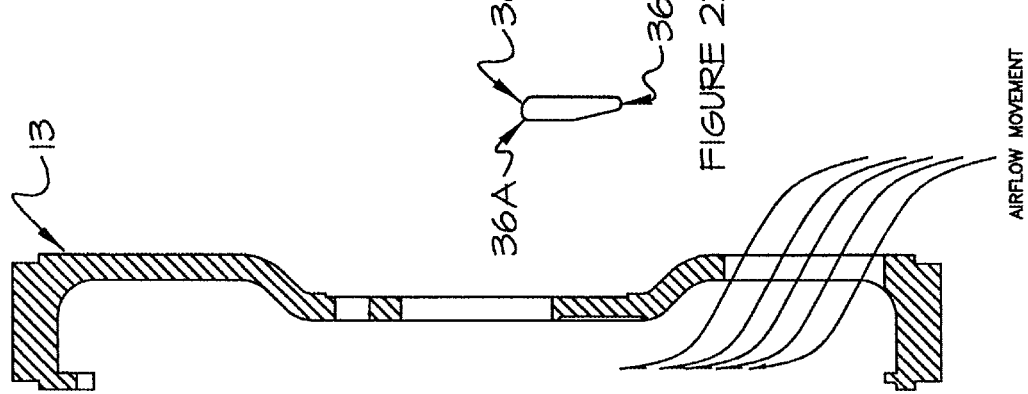

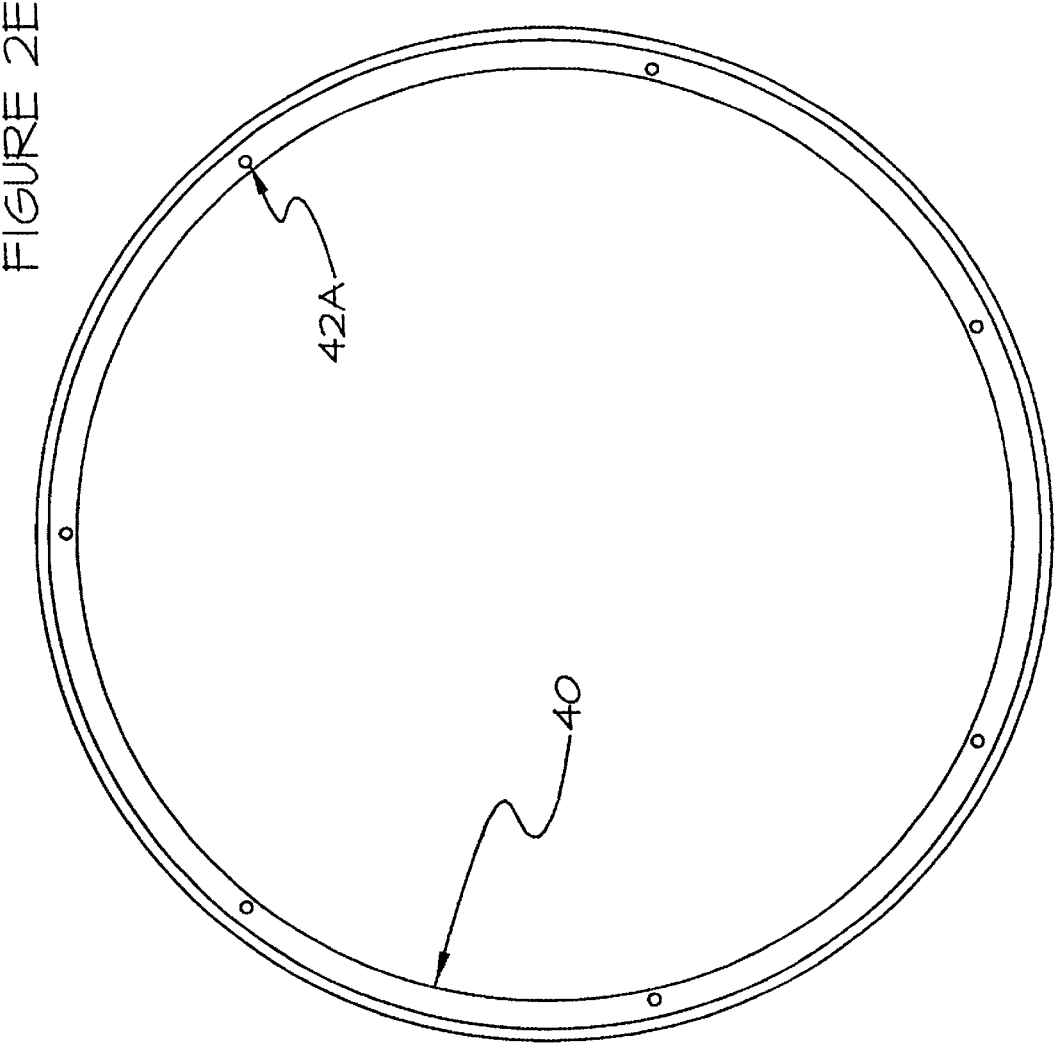
FIGURE 2E
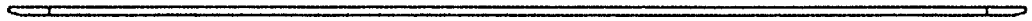

SECTION A-A

SIDE VIEW

FRONT VIEW

BACK VIEW

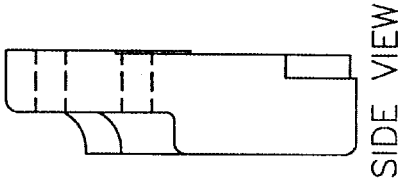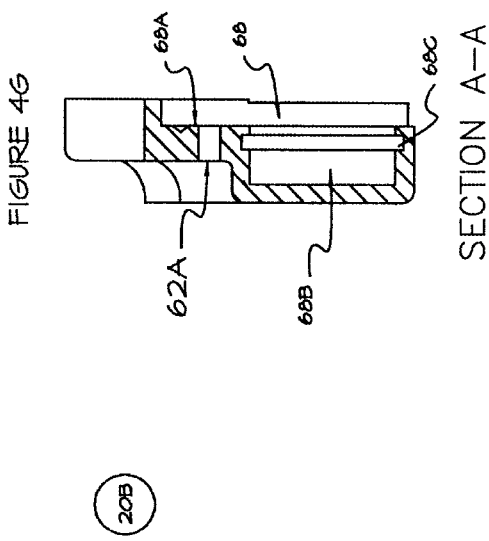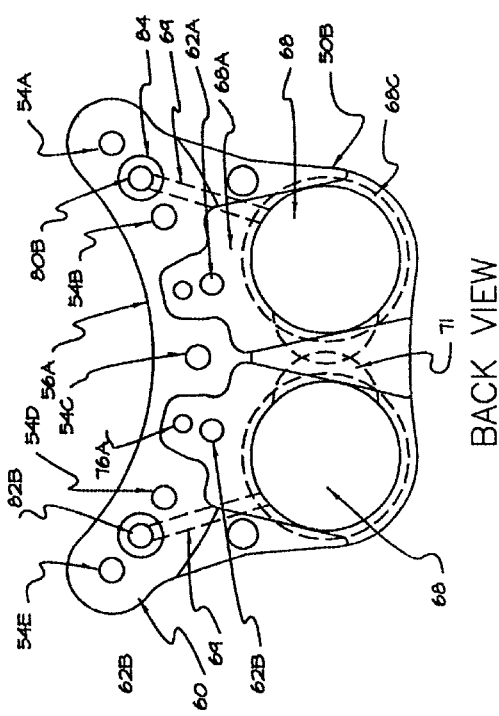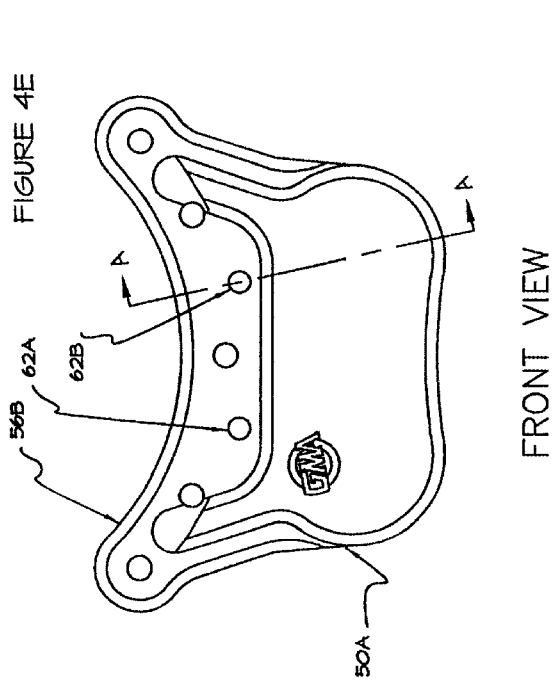

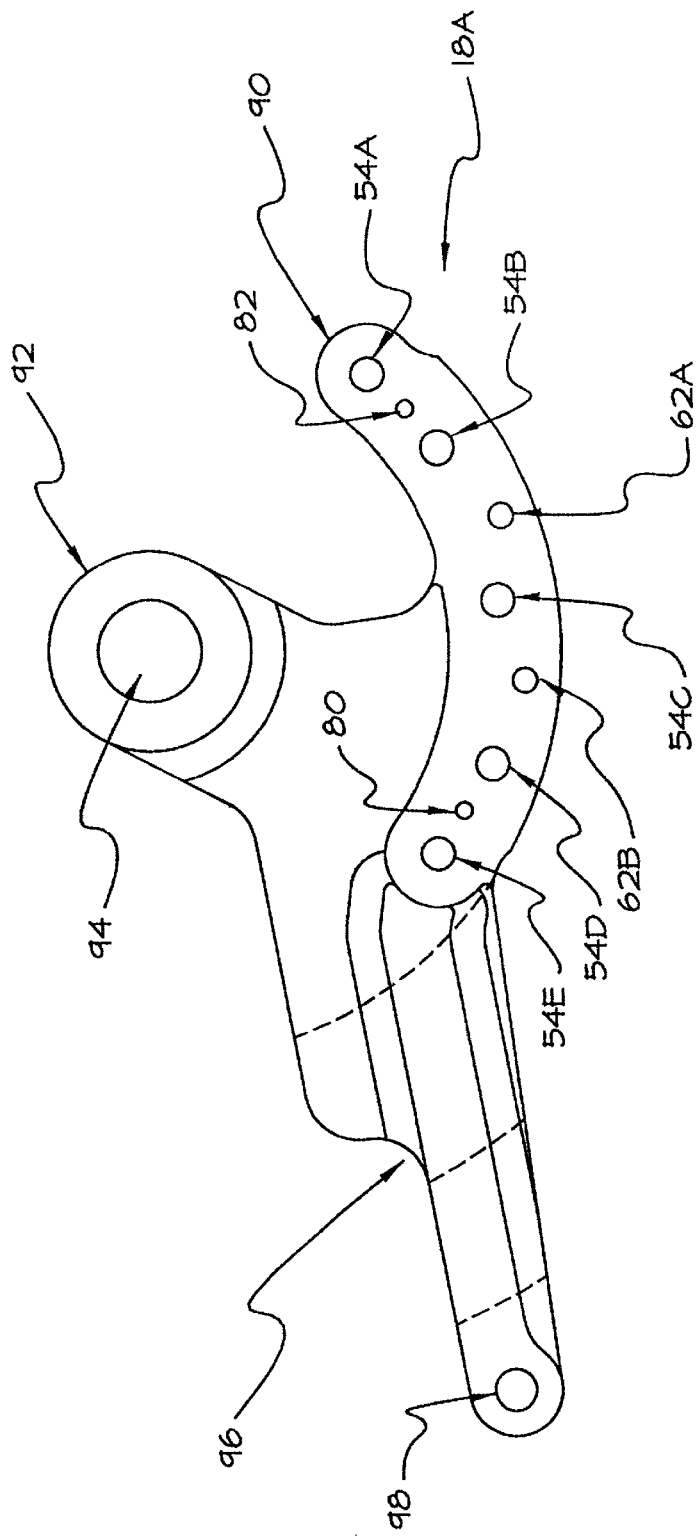
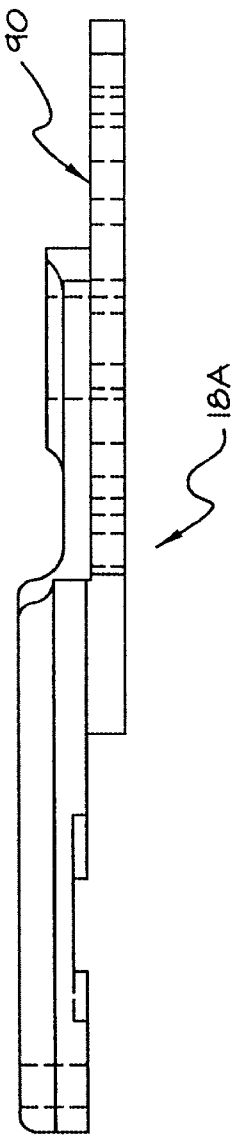
FIGURE 4L
FIGURE 4K

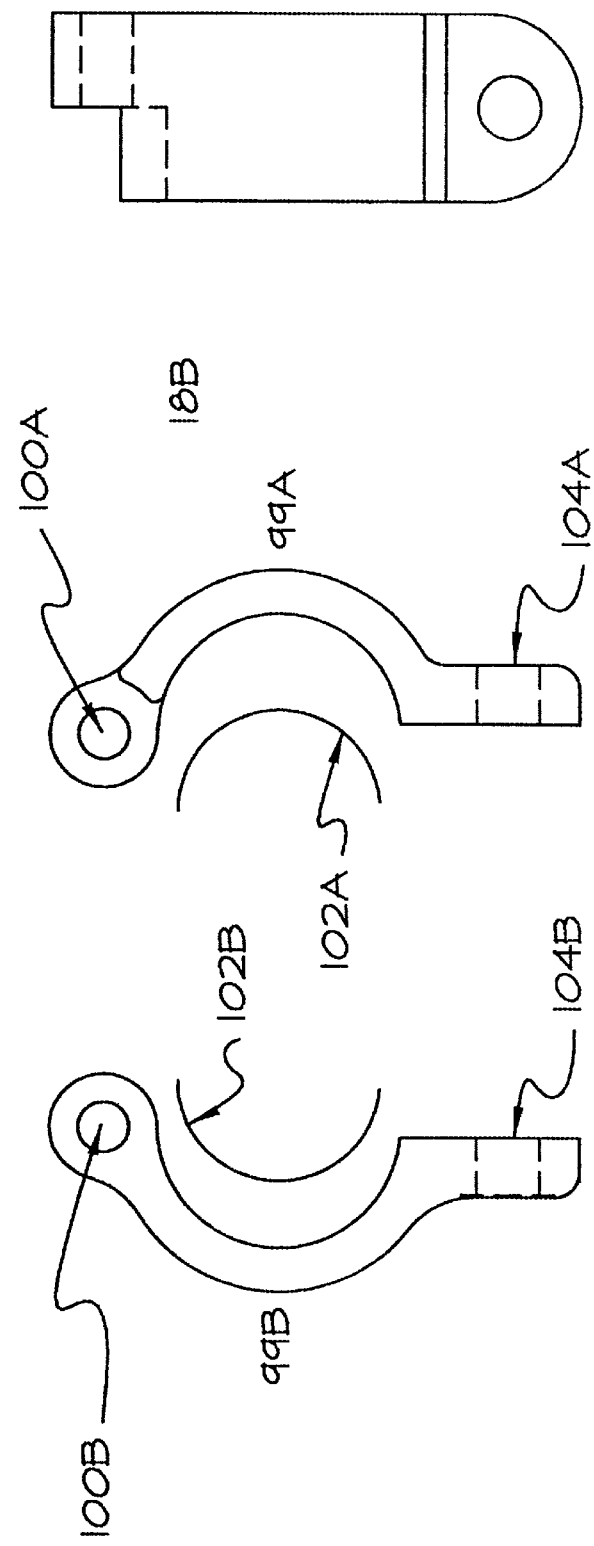

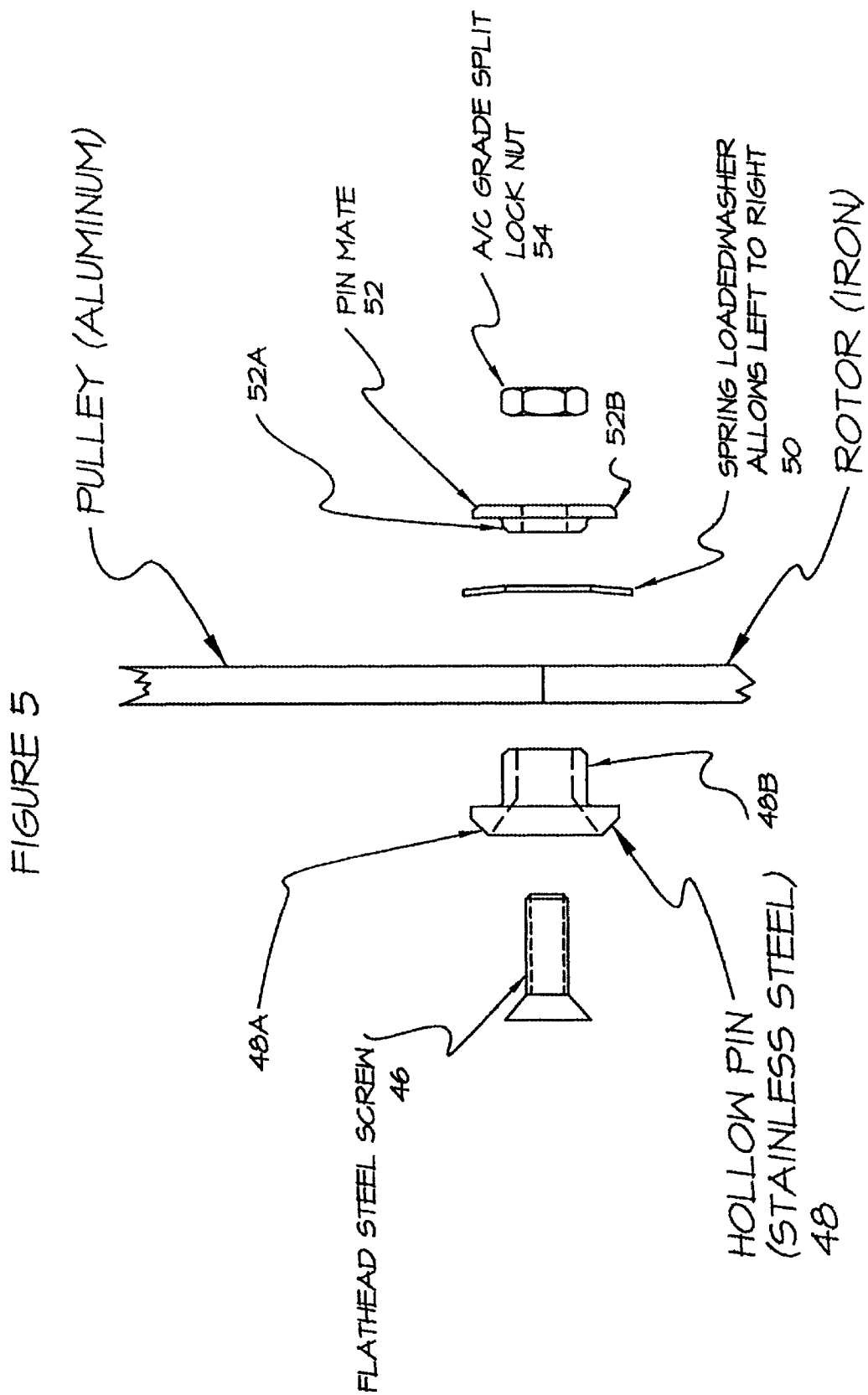

BRAKE AND PULLEY ASSEMBLY FOR A MOTORCYCLE

BACKGROUND OF THE INVENTION

1. Field of the Invention

Motorcycle brakes, more specifically a motorcycle brake for the rear wheel of a motorcycle in which a pulley driving the rear wheel has, integral therewith, a rotor, more specifically a retrofit brake and pulley assembly for fitting to the hub of a rear wheel of a motorcycle.

2. Background of the Invention

Motorcycles are enjoying a resurgence in popularity, especially Harley Davidson, America's oldest motorcycle and manufacturer of the most popular cruiser motorcycle in the world.

Motorcycles have a frame, an engine, wheels, control systems and a means for braking or slowing the motorcycle. For many years, braking in motorcycles as in cars, was done with drum brakes. Drum brakes have an outer drum which rotates with the wheel of the vehicle. Inside the outer drum are brake shoes actuated on levers to expand outwardly against the inner surface of the rotating drum. This worked well for many years. However, in the early fifties automobiles were getting faster, tires and suspension were improving, and, therefore drum brakes were generating far more heat than before. With the generation of heat in the drum, "brake fade" would sometimes occurred. First Jaguar and then other automobile manufacturer adopted disc brakes which had been used earlier on aircraft. The disc brake attaches a disc shaped rotor to the wheel and uses a caliper in which hydraulically actuated pistons act against brake pads which are, in turn, urged against the spinning rotor. Since, except for the area of the rotor directly adjacent the caliper body, the disc is free to spin through the air, more affective cooling results than is available from drum brakes.

Motorcycles followed automobiles and eventually adopted disc brakes. Disc brakes were first used for the front wheel and then for the rear wheel. In motorcycles and cars, during braking, most of the stopping force is generated on the front wheel or wheels and therefore it is the front wheel or wheels on which the disc brake first appeared. However, it has become fairly common practice in the motorcycle industry today to provide the rear wheel with a disc or rotor. Indeed, the popular Harley Davidson is manufactured with a rear wheel mounted disc on the (driver's) right hand side. The rear Harley-Davidson wheel is driven by a toothed pulley attached to the left side of the hub which is driven by a toothed rubber belt which, in turn, is driven by a drive sprocket emerging from the engine cases on the left side of the motorcycle engine (driver's left). However, for various reasons, many of the motorcycle riders, including Harley Davidson enthusiasts, desire the right side of the motorcycle to look "clean"—that is, uncluttered. Utility therefore, lies in the removal of the disc from the right side of the hub of the motorcycle to the left (pulley) side. Further, utility lies in providing an intragal pulley and rotor unit wherein one can remove the rotor from the right side of the motorcycle and incorporate it into a pulley on the left side of the motorcycle.

Utility also lies in providing a unitized pulley and rotor system which can bolt directly onto a preexisting bolt hole pattern of the hub of the rear wheel of a motorcycle. By doing so, the user is released from the difficult and potentially dangerous task of drilling holes into the hub of a motorcycle to mount a rotor thereto. Further, utility lies in providing a rotor which is attachable to a pulley-rather than directly to the hub and in a pulley which is machined with bolt holes matching the preexisting bolt holes of the hub of the motorcycle. Therefore, in summary, utility lies in providing an integral pulley and rotor unit in which the rotor attaches to the pulley and the pulley to the hub. Utility also lies in providing such a feature where the pulley and rotor unit can be bolted onto the existing bolt hole pattern of an OEM hub.

Additional utility lies in providing a rotor mounting or fastening system which allows some "play" or movement left and right and up and down of the rotor with respect to the pulley to which is attached. Such a feature will help minimize heat transfer from the rotor to the pulley, such heat generation on the pulley being deleterious to the belt.

Further utility lies in providing such a unit with teeth, the teeth for engaging a belt driven by the motor, which teeth are hard anodized to reduce wear.

Additional utility lies in providing a pulley and rotor unit which is dimensioned to help promote the flow of air past the rotor, thereby increasing the effectiveness of the cooling of the rotor.

Applicant further finds utility in providing a ductile iron rotor for attachment to an aluminum pulley, with a third metal fastening the rotor to the pulley to minimize the transfer of heat.

Applicant finds yet further utility in providing a caliper with brake pads for engagement with the rotor, the caliper including means to locate the caliper body adjacent the inner perimeter of the rotor.

Set forth above are some of the utilitarian features found in Applicant's unique brake and pulley assembly, others will be apparent from a review of the specifications and drawings set forth herein.

SUMMARY OF THE INVENTION

Applicant provides a brake and pulley assembly for retrofitting to the hub of the rear wheel of a motorcycle, the hub mounted on an axle to the frame of a motorcycle, typically at the swingarm thereof, which brake and pulley assembly locates a rotor and a caliper assembly adjacent the inner perimeter (rather than the outer perimeter) of the rotor.

The invention provides for a pulley and brake assembly including a pulley with an outer rim and inner rim, with arms attaching the outer rim to the inner rim, which arms are shaped to deflect air to thereby assist in the cooling of the rotor. Applicants invention further provides for a brake and pulley assembly including a pulley and rotor unit, the rotor fastened to the pulley with the use of fasteners that allow some movement of the rotor with respect to the pulley to help prevent heat transfer from the rotor to the pulley.

This and other objects are provided for in an invention which the rotor is made of a first metal (such as iron), the pulley a second metal (such aluminum) and fasteners for holding the rotor to the pulley made yet of a third metal (such as stainless steel).

This and other objects of the invention are provided for in a rotor which attaches to the pulley through the use of a fastener system, which includes spring loaded elements which allow the rotor some flex with respect to the pulley, and also to minimize heat transfer from the rotor to the pulley.

This and other objects are provided for in a pulley and rotor unit in which the pulley has a bolt hole pattern defined by a multiplicity of bolt holes, which pattern matches the pattern of the hub of the stock motorcycle, hub so that Applicant's unique pulley and rotor unit may bolt directly onto the stock hub of a motorcycle, such as a Harley Davidson (including the Softtail model, FXR, DynaGlide Sturgis, Daytona and Rigids).

Applicant's provide a kit including a unique pulley and rotor unit, designed to directly bolt on to a preexisting Harley Davidson hub such as the hubs of those models described above and others with no welding (except for the Rigid tail, which kit has a tab for welding on to the frame).

Applicant's chrome caliper and iron rotor are mounted inward with respect to the pulley and are machined from a CNC billet. A 70 tooth pulley fits OEM belts, such as the Gates model HTD 1½ (13.9 mm pitch) belt. "Ducted fan" pulley arms are designed to help cool the brake rotor. The rotor composition is chrome plated ductile iron. The kit includes stainless steel brake lines and mounting hardware.

BRIEF DESCRIPTION OF DRAWINGS

FIG. 1D is an elevational view of some of the parts of a motorcycle in which Applicant's invention is used.

FIGS. 2A, 2B, 2C, 2D, and 2D' are various views of the pulley of Applicant's present invention.

FIG. 2E is a side elevational view of the pulley ring used with the pulley of Applicant's present invention.

FIGS. 4E through 4H are front, back, sectional and side elevational views of the back portion of the caliper body of Applicant's present invention.

FIGS. 4K and 4L are front and side elevational views respectively of the anti-rotation assembly for use of the caliper of Applicant's present invention (Softail and Rigid Models).

FIGS. 4M and 4N are front and side views respectively of the anchor for use with the anti-rotation arm for use with the caliper of Applicant's present invention (Softail and Rigid Models).

FIG. 5 is a partial view of Applicant's present invention illustrating the manner in which fastener assembly (16) attaches the pulley to the rotor.

DETAILED DESCRIPTION OF THE PREFERRED EMBODIMENT

Figure 1A:
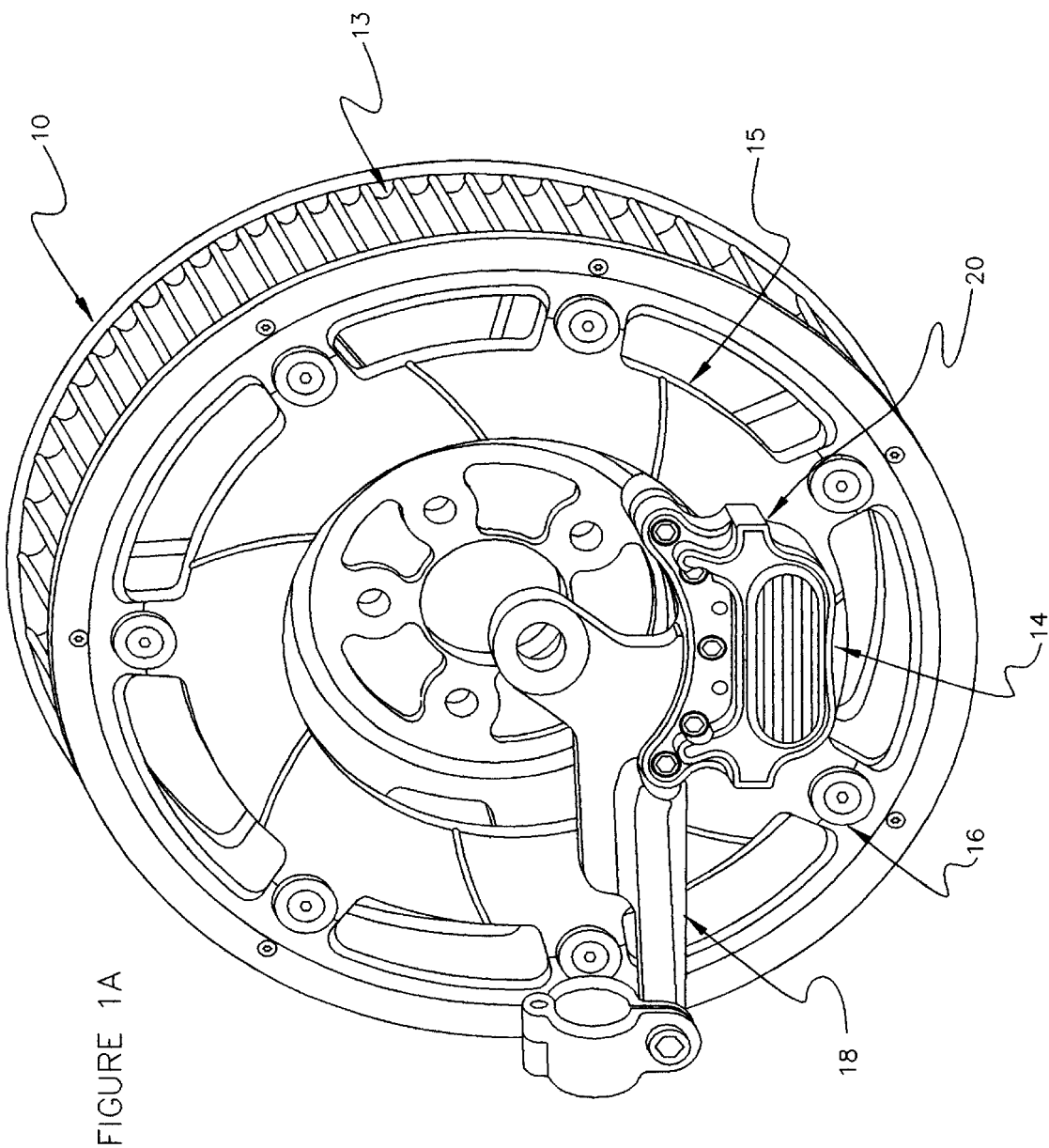
FIG. 1A is a perspective view of Applicant's invention (Softail Model).

FIG. 1A is a perspective view illustrating the main components of Applicant's unique brake and pulley assembly (10). The brake and pulley assembly is seen to include a round pulley (13) for engaging a toothed belt (not shown) driven by the engine of the motorcycle (not shown) and a rotor (15), the rotor rotating with the pulley when the pulley is driven by the engine. A caliper assembly (14), typically mounted to the frame and axle, includes a caliper body (20) that will engage the spinning rotor to slow the motorcycle down. The caliper assembly (14) includes a caliper anti-rotation assembly (18) for preventing the caliper body from moving when it engages the rotating rotor. A floating fastener pin assembly (16) fastens pulley (13) to rotor (15) in a unique manner as set forth for fully below.

Figure 1B:
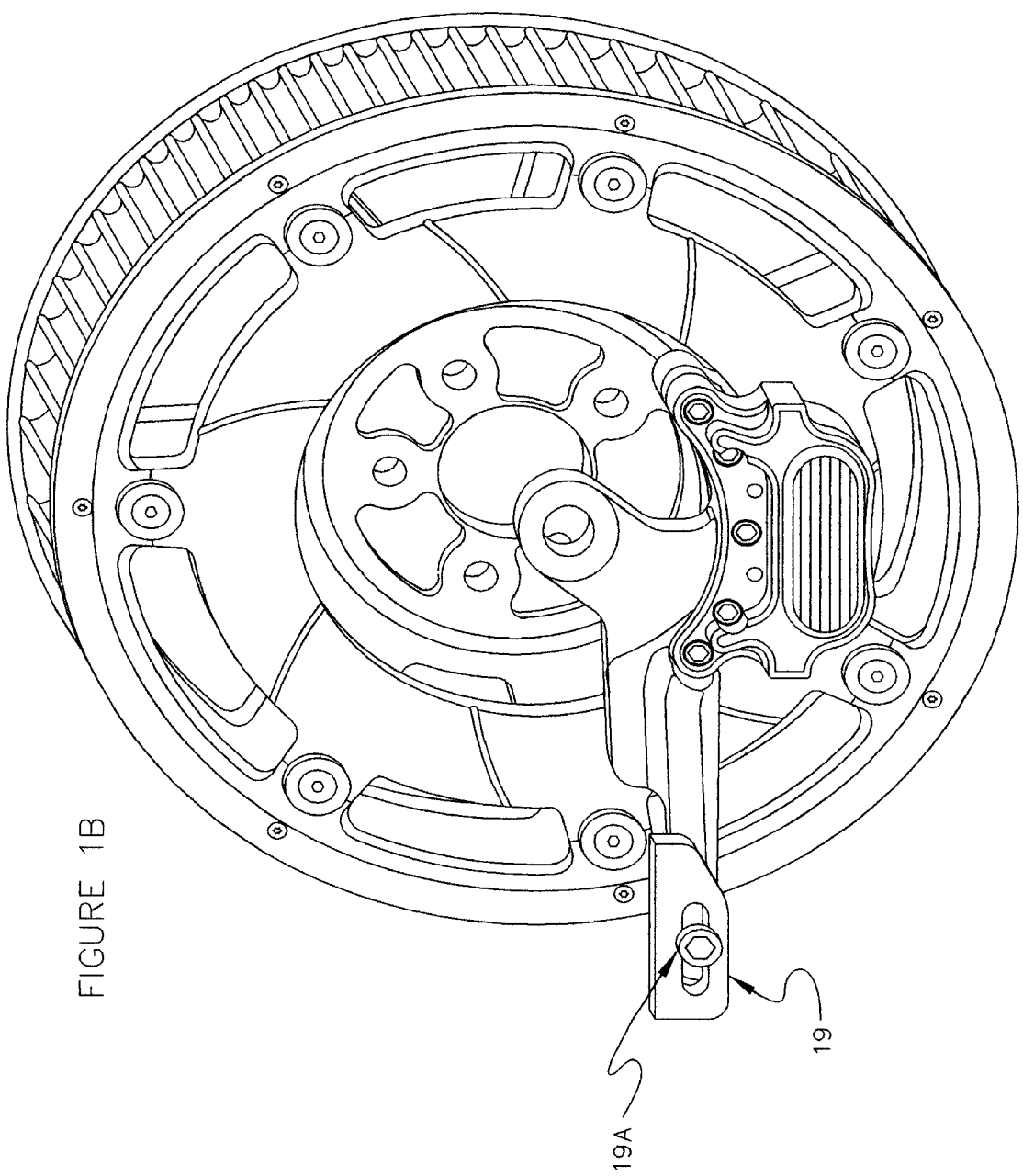
FIG. 1B is a perspective view of Applicant's invention (Rigid Model).

FIG. 1B illustrates the use of a tab (19) in conjunction with a locating bolt (19A) to hold the caliper bracket and caliper in place adjacent the inner perimeter of the rotor. This particular structure is used for a Harley Davidson Rigid Model. Also, for this particular model, tab (19) is welded onto the frame member which holds the axle in place. In other words, unlike the other mounting methods featured in this application, for this particular model welding a tab to the frame is required. Tab (19) is seen to have a slot into which locating bolt (19A) is located, which is tighten into the caliper bracket to help hold the caliper body in place.

Figure 1C:
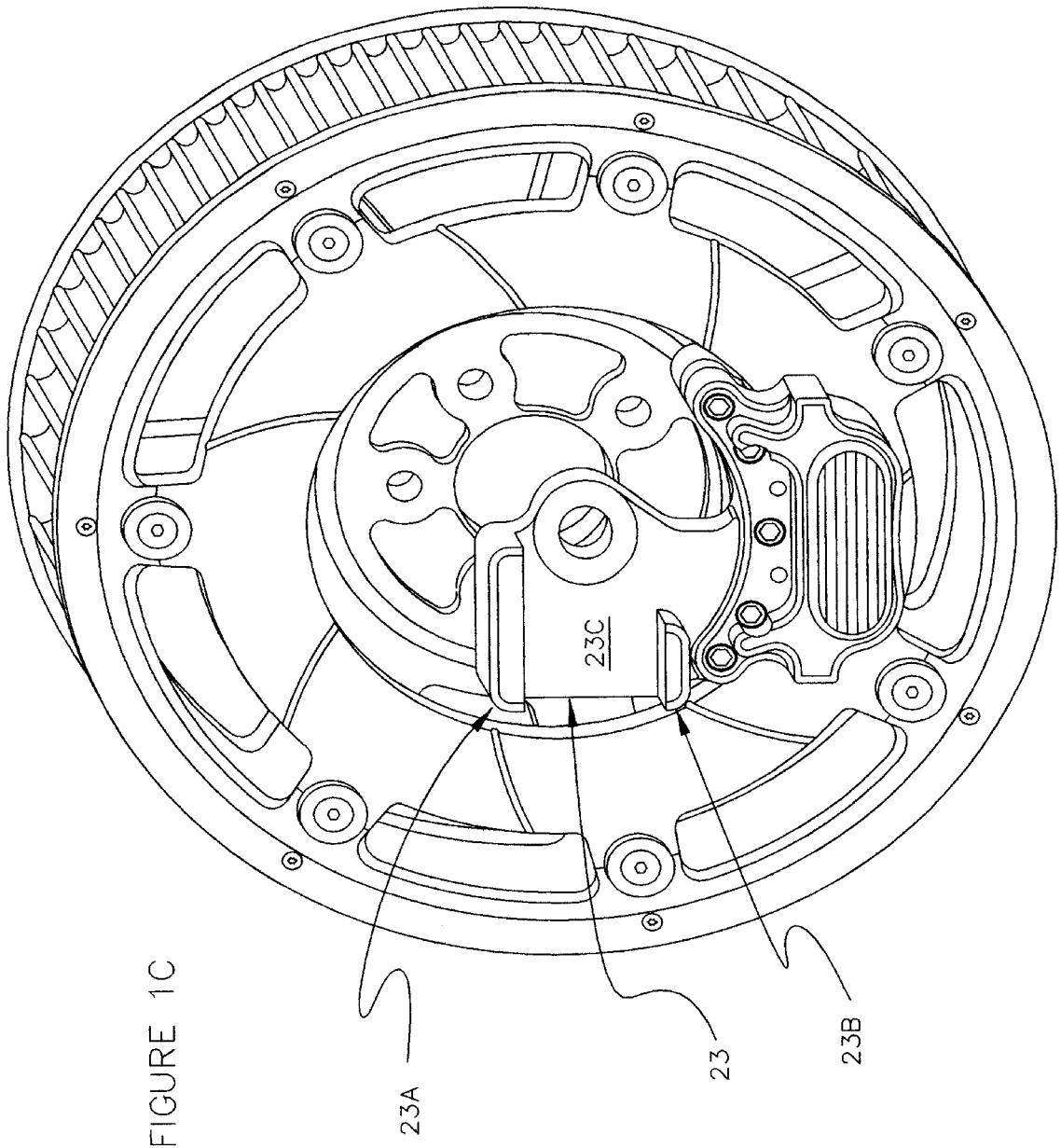
FIG. 1C is a perspective view of Applicant's invention (FXR and Dyna Models)

FIG. 1C illustrates the use of a caliper bracket slot (23) which includes upper and lower projections (23A) and (23B) respectively and a face (23C), dimensioned so that the projections and face have a snug fit with a swing arm or frame member that is rectangular in cross section. Such rectangular section swing arms are found, for example, on Harley Davidson FXR and Dyna models. It is seen that the distance between the inner faces of projections (23A) and (23B) are about the width of the rectangular cross section tube against which they fit. Face (23C) will be flush up against the inner face of the cross section and therefore rotation of the caliper body will be prevented by interference between the projections and the swingarm.

FIG. 1D illustrates, in part, the environment in which Applicant's unique pulley and brake assembly operates. More specifically, FIG. 1D illustrates a rear wheel hub (B) of a motorcycle (here, a Harley-Davidson Softail), the rear wheel hub (B) mounted on an axle (E). Between the outer most portions of the hub and the swingarm (D) of the frame of the motorcycle is, typically, an OEM spacer (here on the right side as viewed from the rear of the motorcycle) and, typically, two additional spacers #1 and #2 which Applicant provides for mounting the unique, retrofittable brake and pulley assembly to the axle and frame. Other spacers may be used as required for other makes and models of motorcycles.

FIGS. 2A through 2E illustrate additional features of Applicant's pulley (13). More specifically, these figures illustrate pulley (13) comprising an outer rim (22), and an inner rim (24) with arms (26) (here a total of seven) extending between the outer rim and the inner rim.

The outer rim has an outer surface defined by a multiplicity of teeth (28). The pulley is typically manufactured from aircraft quality aluminum, more typically 6061 grade T6. The teeth are typically hard anodized with aluminum oxide to increase their hardness and durability.

The diameter of the outer rim (not including teeth) is typically about 11.5 inches. The number of teeth is typically 70. The teeth are typically shaped to engage a Gates® belt such Gates® model HTD 1½ (13.8 mm pitch).

The inner rim includes central cutout (30), which excepts a boss on the wheel hub. An embodiment of the pulley may include decorative bays (32) such as illustrated in FIG. 2A. It is noted that inner rim (24) includes a multiplicity of bolt holes (34), here five in number, the multiplicity defining a bolt hole pattern (here pentagonal) which is intended to match the stock bolt hole pattern of the OEM hub (B). For example, Harley Davidson hubs such as hubs for Harley Davidson Softtail models, FXR's, Rigids (1936 to present) and DynaGlides (1992 to present) and all Strugis and Daytona models have a five hole (pentagonal) pattern as represented in FIG. 2A. Therefore, Applicant's pulley can bolt directly to a stock hub of one of these Harley Davidson models. In other embodiments for other models or manufactures, other pulley bolt hole patterns may be used, so as to retrofit the pulley of Applicant's brake and pulley assembly to the stock OEM hub.

The pulley arms (26) are seen to include an arm body (36), the arm body having a shaped leading edge (36A) and a tailing edge (36B). The arm body as seen FIG. 2D' is seen to be vane shaped so as to assist in generating air flow through the pulley to help cool the rotor and the pulley. Other shapes may be used to generate air flow to the rotor.

In FIG. 2A it is seen that outer rim (22) has, projecting inward radially therefrom, a set of, typically, seven rotor mounting stubs (38) each of which include a concave cutout (38A). Further, it is seen that the rotor mounting stubs are preferably located adjacent each of the arms. FIG. 2E illustrates a pulley ring (40) for mounting on outer rim (22) by matching attachment holes (42A) and pulley ring attachment holes (42B) of outer rim (22) (see FIG. 2A) and using fasteners (not shown) known in the trade. A ring (40) will fit on each side of the teeth (see FIG. 2B) and will help maintain the belt on an engagement with the teeth.

Figure 3A:
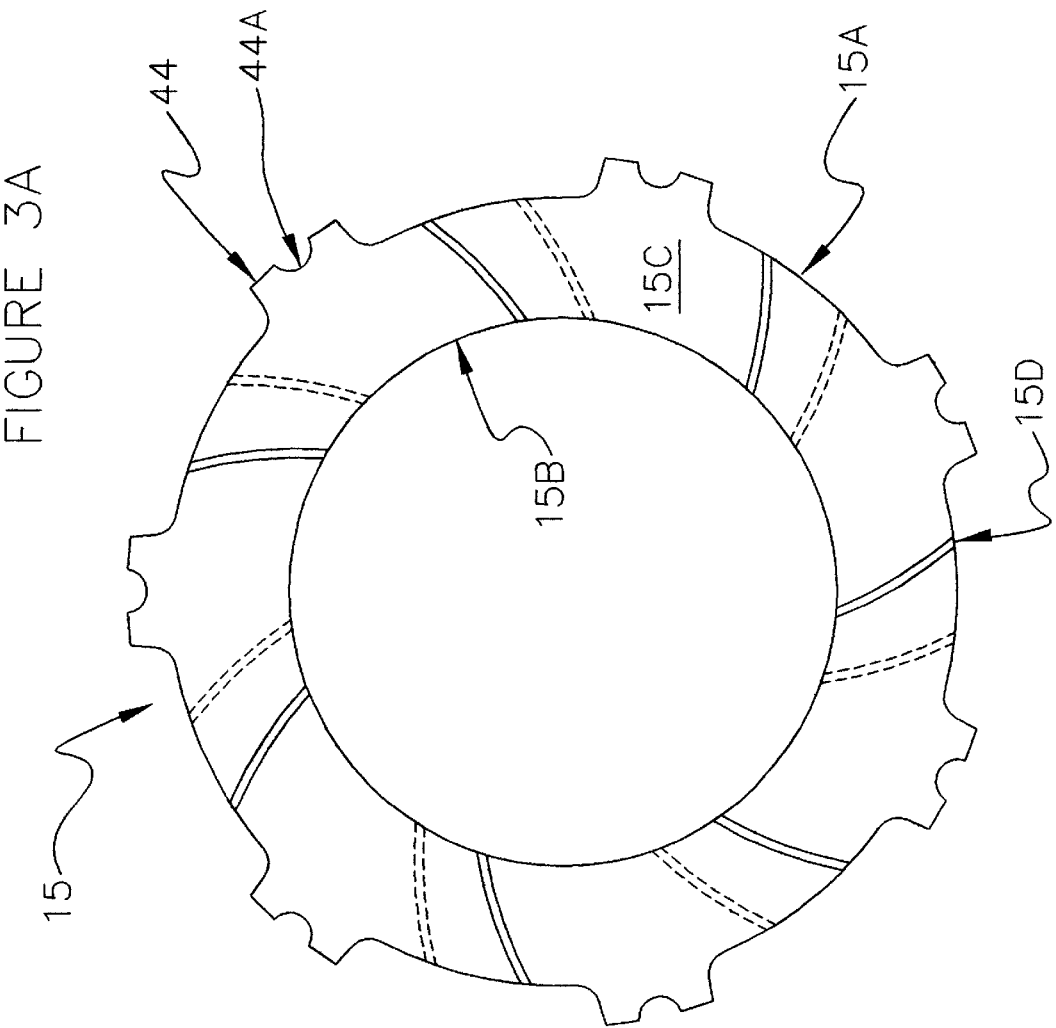
FIGS. 3A and 3B are front and side elevational views of the rotor of Applicant's present invention.
Figure 3B:
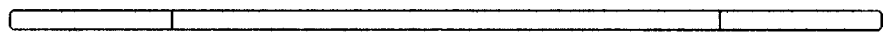

FIGS. 3A and 3B illustrate details of the rotor. The rotor is disc or ring shape and has an outer perimeter (15A) and an inner perimeter (15B). Furthermore, rotor (15) has an outer face (15C) and an inner face. Both the outer face and the inner face have a series of ¼" ball groves (15D) therein whose function is to allow for the escape of gases formed by the friction of the pads contacting the rotating rotor. The rotor is typically about 0.225 inches in thickness and made of ductile iron. The outer perimeter of the rotor includes outwardly projecting rotor mounting stubs (44), the rotor mounting stubs having semicircular cutouts (44A) therein. Compare the figure of the rotor set forth in FIG. 3A with that of pulley (13) set forth in FIG. 2A and it can be seen that rotor mounting stubs (44) of the rotor match up with rotor mounting stub (38) of the pulley such that semicircular cutouts (38A) and (44A) define a complete circle through which floating pin assembly (16) are inserted to fasten the rotor to the pulley in a manner set forth in more detail below.

FIG. 5 details Applicant's unique floating fastener pin assembly (16). Applicant's floating pin assembly includes a linear combination of a flat head hex head steel screw (46) mating into and through a stainless steel, hollow, screw seating pin (48), for seating screw (46) against the outside surface of rotor mounting stubs (38) and (44) with the stainless steel seating pin having a head (48A) larger than the diameter of cutouts (38A) and (44A). A shaft (48B) of stainless steel pin (48) is slightly smaller in diameter than the diameter of the cutouts and the length of the shaft (48B) of the seating pin is sufficient to extend part way through the thickness of the stubs (38), (44). Against the inside face of the stubs encircled by a seating pin mate (52) is a spring loaded, slightly concave (to the inner face of the rotor and pulley) spring loaded washer (50). Sliding over the shaft of the flat head screw is pin mate (52) which has a shoulder (52A) which shoulder meets up against the distal perimeter of shaft (48B) such that when split lock nut (typically aircraft grade) (54) is treaded on to the end of the threaded shaft of the flat head screw, shoulder (52A) of pin mate (52) is urged against the removal end of shaft (48B) of stainless steel pin (48) while head (52B) of pin mate (52) urges washer (50) to a loaded condition (put not fully flush) against that portion of the inner face of mounting stubs (38), (44) that is adjacent to cutouts (38A) and (44A). The effect of dimensioning stainless pin (48) and pin mate (52) with shaft diameters slightly less than the inner diameter of cutouts (38A), (44A) and the effect of dimensioning shaft length (48B) of stainless pin (48) plus the dimension of (52A) larger than the thickness of the stubs, combined with the use of spring loaded washer (50) is to effect a "floating" of the rotor with respect to the pulley such that there is a slight amount of left to right movement of the rotor (as seen in FIG. 5) against the spring loaded washer (typically loaded to about 50 foot-pounds). Further, the use of stainless steel between the iron rotor and the aluminum pulley helps to keep the heat from the pulley. That is, under heavy breaking, the rotor, as a result of fiction with the pads of the calipers, heats up. If this heat is allowed to transfer to the pulley and the belt, it is detrimental to the belt. Therefore, by using a "floating" rotor and stainless steel between the iron and the aluminum, less heat is transferred to the pulley than if there were a rigid mount. Further, the rotor may expand slightly under heat and warpage will not effect the pulley.

FIGS. 4A through 4K illustrate components of Applicant's caliper assembly 14. The caliper body (20) includes a front portion (20A) (FIGS. 4A through 4D), the front portion having an outer face (50A) and an inner (50B). There is also a back portion (20B) (FIGS. 4E through 4H), which back portion (20B) also has an outer face (50A) and an inner face (50B). The two portions (front portion (20A) and back portion (20B) are connected through the use of attachment bolts inserted through bolt holes (54A) through (54E), which bolt holes typically accept a ¼" allen head hardened machine screw and attach back portion (20B) to front portion (20A) sandwiching caliper bracket (18A) there between (see FIG. 4K). Therefore, it is seen that the caliper bracket locates the front and back of the caliper body (20) adjacent the rotor (see FIG. 1), the bracket held in place by the axle and the swingarm as set forth in more detail below.

Figure 4C:
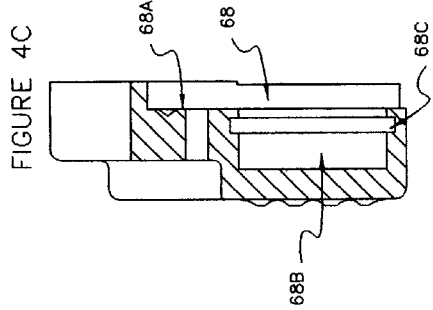
FIGS. 4A through 4D are front, back, sectional and side elevational views prospectively of the front portion of the caliper body of Applicant's present invention.
Figure 4D:
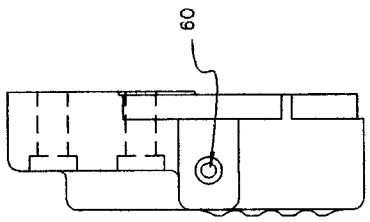
Figure 4A:
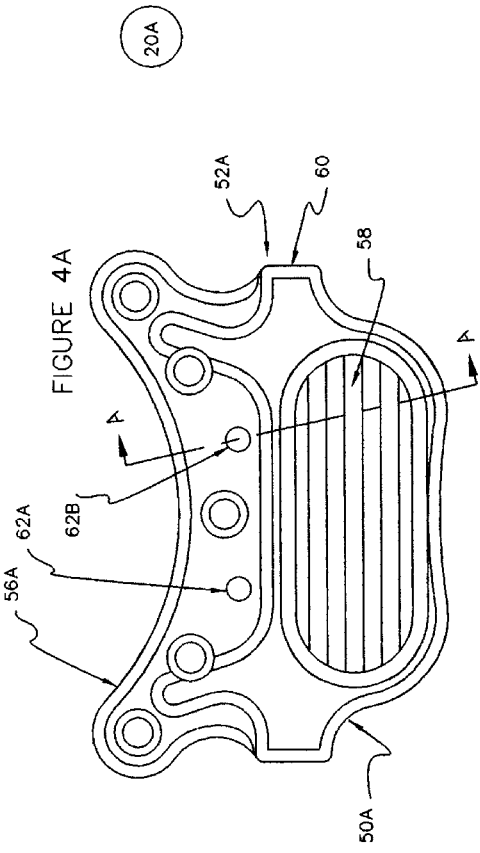

Moreover, with reference to FIGS. 1, 4A, through 4L it is seen that the caliper body mounts from the "inside out-meaning" that the bracket locating the caliper body locates the caliper body to the inside of the inner perimeter of the rotor. Conventional teaching for brackets attaches the caliper adjacent the outer perimeter of the rotor and attaches the rotor to the wheel through attachment means located inward from the inner diameter of the rotor. Here Applicant has reversed conventional teaching by the use of attachment stubs as set forth in more detailed above, projecting from the outside of the perimeter of the rotor and by using Applicant's unique attachment bracket as set forth in more detail below, mounting the caliper body adjacent the inner perimeter of the rotor. This has allowed Applicant to make a compact rotor which will move with the pulley and to locate the caliper body adjacent the inner rim of the rotor in fixed relation with respect to the rotor. Further with reference to FIGS. 4A through 4H it is seen that both the front portion and back portion of caliper body (20) have radiused inner edges (56A) and (56B) respectably, radiused to, typically, match the radius of the inner perimeter of the rotor. With reference to FIG. 4A it is seen that a part of outer face (50A) may include ornamental ridges (58) to created an attractive view of the device. It is also seen that the front portion (20A), typically near the rear (facing the rear of the motorcycle) thereof is drilled and tapped for a brake bleeder valve (60) (see FIGS. 4A and 4D) for bleeding the hydraulic fluid and/or air from the brakes.

Figure 4B:
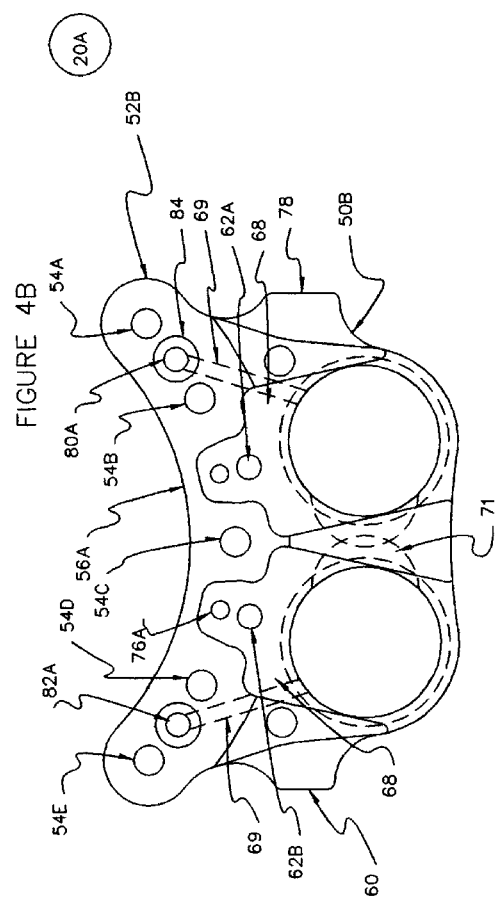
Figure 4J:
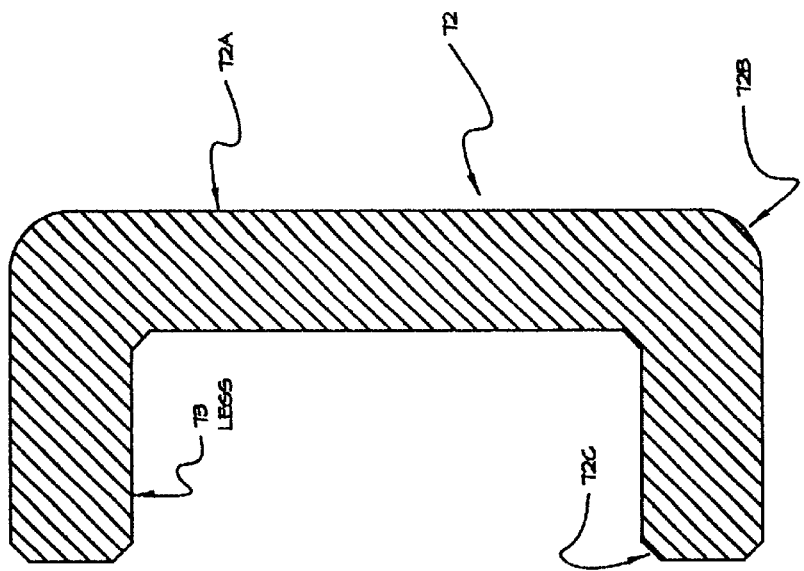
FIGS. 4I and 4J are front and side sectional elevational views of a piston for use in the caliper of Applicant's present invention.
Figure 4I:
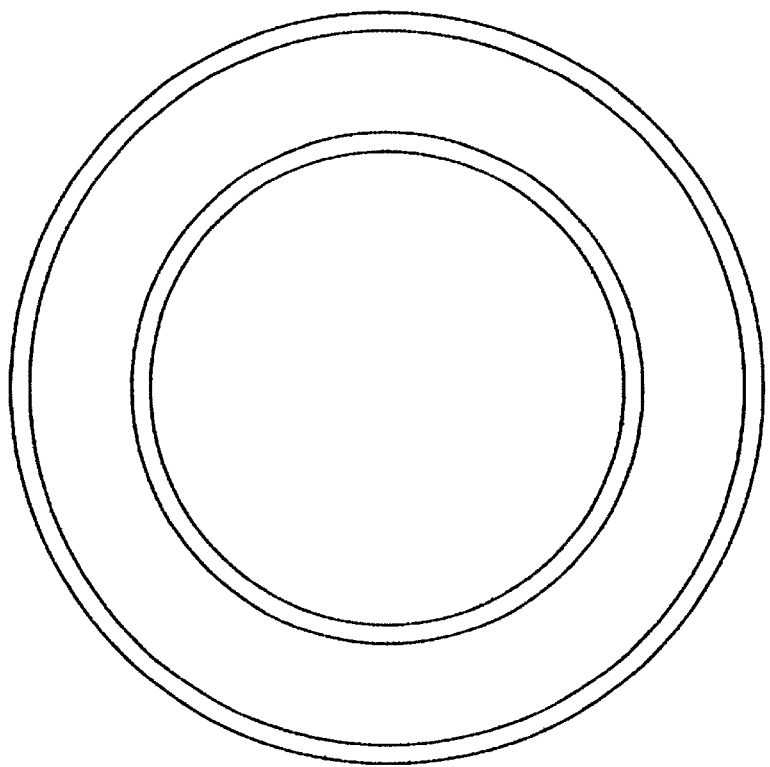
Figure 4P:
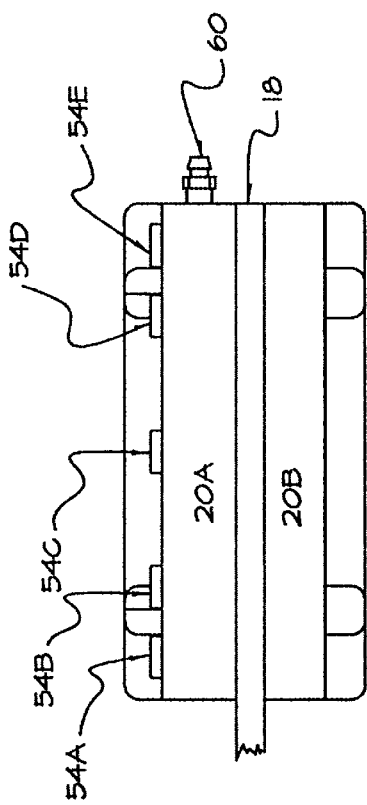
FIG. 4P is a side elevational view showing how the two caliper bodies of Applicant's present invention "sandwich" the caliper bracket.
Figure 4O:
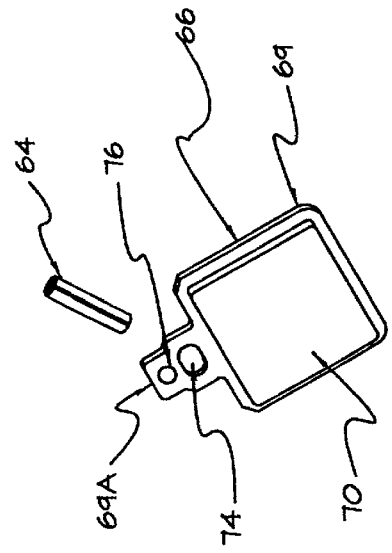
FIGS. 4O is a perspective view of the brake plate for use with the caliper of Applicant's present invention.
Figure 4Q:
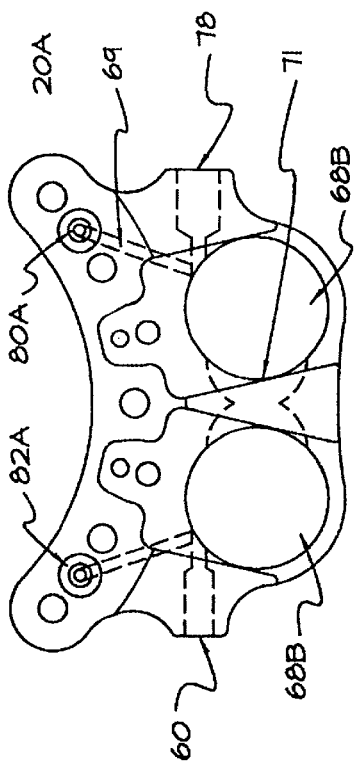
FIGS. 4Q and 4R represent front elevational view and side cross-sectional view of the front portion of the body of Applicant's present invention illustrating the brake fluid transfer system.
Figure 4R:
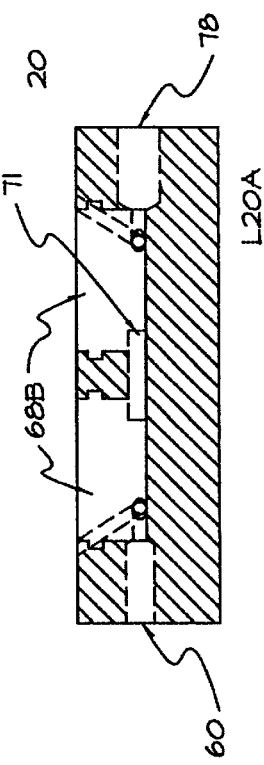

Both front portion (20A) and back portion (20B) have brake locating pin holes 62A and (62B), for accepting therein cylindrical brake plate locating pin (64) (see FIG. 4O). These brake plate locating pins are used to locate brake plate (66) (again see FIG. 4O). In a manner set forth in more detail below.

Turning now to FIGS. 4B, 4C and 4D, inner face (50B) of front portion (20A) will be discussed, with reference to the operation of the caliper. First, as a matter of background, the caliper is hydraulically actuated and consists of a pair of brake pads on a pair of brake plates (66) actuated by front portion (20A) against the outer face of the rotor and a pair of brake pads on a pair of brake plates (66) actuated hydraulically by back portion (20B) against the inward facing or inner face of the rotor. In overall operation, Applicant's caliper is generally similar to prior art calipers with an exception being the location of the caliper body adjacent the inner perimeter of the rotor. The inner face (50B) of both front portion (20A) (see FIG. 4B) and back portion (20B) (see FIG. 4F) have inner cutouts (68) therein, each of the four cutouts (two on each portion) having a brake plate cutout (68A) which is larger than but generally follows the profile of brake plate (66) (see FIG. 4O). This is typically cut to depth of about 0.255". A second portion of cutout (68) is cylindrical piston chamber (68B) typically cut to a depth of about 0.725". Last, cutouts (68) each include piston "O" ring glands (68C) in the wall defining piston cutouts (68B). Pistons (see FIG. 4I and 4J) are dimensioned to snugly slide within piston cutouts (68B) (typically cut to a diameter of about 1.254"), piston "O" ring glands are cut to about 0.073" in depth from the cylinder walls. As can be seen in FIG. 4I and 4J piston (72) is cup shaped with chamfered edges, with piston face (72A) being radiused (72B). Turning now to FIG. 4O a brake plate 66 is illustrated. Brake plate (66) is seen to be comprised of a base (69) and a brake pad (70). The base is typically made out of flat stock steel. Base (69) includes a pin slot (74) for locating pin (64) there through, each pin (64) will locate two plates (69). At the end of handle portion (69A) of base (69) is a projection or plate locating boss (76) for engagement with plate locating indent (76A), the indent located on the inner faces of the two portions of the caliper (see FIG. 4B and 4F). Pin slot (74) is larger than the diameter of locating pin (64) so that there is some "float" to brake plate (66) as it rests within brake plate cutout (68A). In operation legs (73) will act against the backside of base (69) to urge brake pad (70), located on the front surface of base (69), against the revolving rotor, to effect a decrease in the rotation of the rotor through the action of friction on the face of the rotor. This is a fundamental principal on which disc brakes operate.

With reference to FIGS. 4A–B and 4Q–R and the brake fluid and pressure transmission pathway it is seen that front portion (20A) includes a brake fluid inlet port (78) (for receipt of brake fluid and pressure from a brake master cylinder) in communication with piston cutouts (68B) and transfer ports (80A) and (82A). Front portion (20A) transfers brake fluid and brake pressure from front portion (20A) to transfer port (80B) on back portion (20B) (see FIGS. 4B and 4F). Likewise, transfer port (82B) transfers brake fluid and fluid pressure from back portion (20B) to front portion (20A) through transfer port (82A). The transfer ports are in communication with the respective cylinders to which they are adjacent through ducts (69) and adjacent cylinders in each body portion are connected through fluid cross-over ports (71) so that there is fluid communication from brake fluid inlet port (78) to bleeder valve (60) and to all four cylinders. "O" Rings (84) are provided it is noted with respect to the figures, including FIGS. 4B, 4F and 4Q so the transfer ports are aligned with ports (80) and (82) through the bracket 18A such that the "O" rings (four total) are urged against the face of the caliper bracket adjacent ports (80) and (82) so that brake fluid does not leak out.

FIGS. 4K, L, M, and N illustrate details of Applicant's caliper anti-rotation assembly (18) (for Softials) which includes bracket (18A) for mounting the caliper to axle and to the swing arm and also a clamp (18B) for attaching bracket to the swingarm. Bracket (18A) is dimensioned with a caliper engagement portion (90), which is typically radiused as illustrated in FIG. 4L to match the caliper body (see for example FIG. 4B). It is seen that bracket engagement portion (90) has the bracket attachment holes, brake pad pin engagement holes and ports therein as set forth above. Second portion of bracket (18A) is axle engagement portion (92) which includes centrally located cutout (94) which is design to engage the axle. A third portion of bracket (18A) is swingarm engagement arm (96) which includes clamp mounting hole (98) at a distal portion thereof.

In FIG. 4N it is seen that clamp (18B) includes two semicircular half portions (99A) and (99B), each of which portion contains a bolt hole (100A) and (100B), which two holes will overlap and engage hole (98) in swingarm portion (96) of bracket (18A) and in turn will be engaged with a bolt or other fastener (not shown) such that the two semicircular half portion (99A) and (99B) contribute and rotate downward to encircular a swingarm member. Furthermore, the two semicircular portions (99A) and (99B) are dimensioned to fit snugly around a tubular section swingarm. Moreover, a pair of semicircular bushings (102A) and (102B) will be used between portions (99A) and (99B) and the swingarm itself to prevent damage to the finish on the swingarm. Bushing (102A) and (102B) are typically made of plastic or nylon. It is seen also that there are attachment holes (104A) and (104B) opposite (100A) and (100B) so that, a fastener inserted through (104A) and (104B) will snugly hold the two piece clamp around the swingarm where holes (100A) and (100B) will also hold the clamp against the swingarm but also will hold it to bracket (18A)(This is for Softails Models). Bracket (18A) is dimensioned for engagement with the axle and the swingarm to hold caliper body (20) adjacent the inner perimeter of the rotor, contrary to conventional practice.

Applicant's pulley mounts directly to the stock wheel with matching pulley bolt hole patterns. Spacers may be provided and may used between the caliper mounting bracket and the wheel bearing (see FIG. 1B). The brake and pulley is placed on the wheels and the OEM hex head screws are torqued to 50 ft.-lbs in a star pattern using blue Loc-tite® on the thread. Applicants caliper is typically positioned at about 6 o'clock and the slot in the bracket goes over the swingarm. Shims are provided for axle spacing and it may be necessary to shim the bracket in order to center the caliper over the rotor. Stainless steel brake lines are designed to fit most OEM applications and OEM master cylinders. Stainless line vary in length long (Harley Davidson) and are used in the tee, located behind the transmission between the top and bottom of the belt along the lower tube of the swingarm. The anti-rotation clamp should be placed on the swingarm before installing the wheel, with the plastic bushings between the clamp and the swingarm to protect the paint on the swingarm. The counterbored side of the clamp goes on the outside. The clamp assembly goes on the lowest swingarm tube between the inner belt guard mounting tab and the axle adjuster plate, for example, on the Harley Davidson Softtail models (through 99').

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A brake and pulley assembly for retrofitting onto the hub of a belt driven, swingarm mounted, rear wheel of a motorcycle, the hub having a multiplicity of bolt holes therein forming a bolt hole pattern thereon, the hub mounted on an axle, the assembly comprising;
   a pulley and rotor unit, the pulley and rotor unit including a pulley the pulley including an outer rim and an inner rim with arms extending between the outer rim and the inner rim; the pulley with a multiplicity of bolt holes, the multiplicity of bolt holes generating a bolt hole pattern, the bolt hole pattern substantially matching the bolt hole pattern of the hub of the wheel, for attachment of the pulley thereto so as to rotate therewith, the pulley and rotor unit also including a rotor, the rotor dimensioned for engagement with the pulley of the pulley and rotor unit: the pulley and rotor unit further including fasteners for attaching the rotor to the pulley; and
   a caliper assembly including a caliper body for attachment to the swingarm of the motorcycle, the caliper assembly including means for frictionally engaging the rotor of the pulley and the rotor unit.

2. The assembly of claim 1, wherein the outer rim includes rotor attachment stubs directed inward therefrom, and wherein the rotor of the pulley and rotor unit includes attachment stubs on an outer perimeter thereof, for engagement with the attachment stubs of the pulley.

3. The assembly of claim 1 wherein the fasteners of the rotor and pulley unit are dimensioned to allow for some movement of the rotor with respect to the pulley of the pulley and rotor unit.

4. The assembly of claim 3 wherein the rotor is made of a first metal, the fasteners of a second metal and the pulley of the third metal.

5. The assembly of claim 3 wherein the fasteners include spring loading elements to flexibly urge the rotor adjacent the pulley.

6. The assembly of claim 1 wherein the arms are dimensioned to deflect the flow of air there between.

7. The assembly of claim 1 wherein the rotor of the pulley and rotor unit is disc shaped with an inner perimeter and wherein the caliper assembly includes means to mount the caliper body adjacent the inner perimeter of the rotor.

8. The assembly of claim 1 wherein the caliper assembly includes an anti-rotation arm and bushings for engagement with the swingarm of the motorcycle.

9. The assembly of claim 1 wherein the rotor of the pulley and rotor unit includes teeth and wherein the teeth are hard anodized aluminum.

10. The assembly of claim 1 wherein the pulley of the rotor and pulley unit is aluminum and wherein the rotor is iron.

11. A brake and pulley assembly for retrofitting onto the hub of a belt driven, swingarm mounted, rear wheel of a motorcycle, the hub having a multiplicity of bolt holes therein forming a bolt hole pattern thereon, the hub mounted on an axle, the assembly comprising;
    a pulley and rotor unit, the pulley and rotor unit including a pulley, the pulley including an outer rim and an inner rim with arms extending between the outer rim and the inner rim; the pulley with a multiplicity of bolt holes, the multiplicity of bolt holes generating a bolt hole pattern, the bolt hole pattern substantially matching the bolt hole pattern of the hub of the wheel, for attachment of the pulley thereto so as to rotate therewith, the pulley and rotor unit also including a rotor, the rotor dimensioned for engagement with the pulley of the pulley and rotor unit: the pulley and rotor unit further including fasteners for attaching the rotor to the pulley; and
    a caliper assembly including a caliper body, the caliper assembly including means for frictionally engaging the rotor of the pulley and the rotor unit, wherein the caliper assembly includes anti-rotation assembly for engagement with the swingarm of the motorcycle.

12. The assembly of claim 11 wherein the pulley of the pulley and rotor unit includes an outer rim and an inner rim, with arms extending with between the outer rim and inner rim.

13. The assembly of claim 12 wherein the arms are dimension to deflect the flow of air there between.

14. The assembly of claim 11 wherein the outer rim includes rotor attachment stubs directed inward therefrom, and wherein the rotor of the pulley and rotor unit includes attachment stubs on an outer perimeter thereof, for engagement with the attachment stubs of the pulley.

15. The assembly of claim 11 wherein the fasteners of the rotor and pulley unit are dimensioned to allow for some movement of the rotor with respect to the pulley of the pulley and rotor unit.

16. The assembly of claim 15 wherein the rotor is made of a first metal, the fasteners of a second metal and the pulley of a third metal.

17. The assembly of claim 15 wherein the fasteners include spring loading elements to flexibly urge the rotor adjacent the pulley.

18. The assembly of claim 11 wherein the rotor of the pulley and rotor unit includes teeth and wherein the teeth are hard anodized aluminum.

* * * * *